May 21, 1968
HEINZ KROEBEL
ALSO KNOWN AS HEINZ KRÖBEL ET AL
3,384,316
TAPE TRANSPORT APPARATUS
Filed July 22, 1965
2 Sheets-Sheet 1

INVENTOR.
ALFRED WINKLER
HEINZ KRÖBEL
HERBERT WILSCH
BY
Michael J. Striker
Atty

May 21, 1968 HEINZ KROEBEL 3,384,316
ALSO KNOWN AS HEINZ KRÖBEL ET AL
TAPE TRANSPORT APPARATUS

Filed July 22, 1965 2 Sheets-Sheet 2

INVENTOR.
ALFRED WINKLER
HEINZ KRÖBEL
HERBERT WILSCH

BY

Michael J. Striker
Atty

United States Patent Office 3,384,316
Patented May 21, 1968

3,384,316
TAPE TRANSPORT APPARATUS

Heinz Kroebel, also known as Heinz Krobel, Unterhaching, near Munich, Alfred Winkler, Munich, and Herbert Wilsch, Unterhaching, near Munich, Germany, assignors to Agfa-Gevaert Aktiengesellschaft, Leverkusen, Germany Filed July 22, 1965, Ser. No. 479,363
Claims priority, application Germany, July 25, 1964, A 22,161
20 Claims. (Cl. 242—55.12)

ABSTRACT OF THE DISCLOSURE

Each spindle of a film projector or tape recorder carries a clutch element which can rotate with reference thereto and is drivingly connected with a reel. The spindles are driven and each thereof carries a motion transmitting member which rotates with the respective spindle and is movable into and from engagement with the associated clutch element to thereby provide a direct driving connection between the spindle and the corresponding reel.

The present invention relates to improvements in intelligence reproducing apparatus, and more particularly to improvements in film projectors, tape recorders and similar apparatus wherein a length of photographic film or tape is paid out by a supply reel to be collected by a take-up reel or vice versa. Still more particularly, the invention relates to improvements in the manner in which the reels of film projectors or tape recorders may be mounted on, detached from and driven by their respective shafts or spindles.

It is an important object of the present invention to provide an intelligence reproducing apparatus wherein the reels may be rapidly, conveniently and reliably coupled to and detached from their respective drives and wherein such manipulations may be performed by persons having little technical skill.

Another object of the invention is to provide an apparatus of the just outlined characteristics wherein a single member suffices to selectively set the drive of a reel in requisite position for forward or rewind operation, wherein the same single member is also useful to retain the respective reel in requisite position with reference to its shaft or spindle, and wherein such member also allows for rapid detachment or attachment of the respective reel to its drive.

A further object of the instant invention is to provide a system of very simple and readily decipherable and comprehensible symbols or markers which will assist the operator to determine the momentary condition of the reel drives and which can also serve to assist the operator in rapidly and properly changing the condition of such drives.

An additional object of the invention is to provide a novel driving connection between a film- or tape-storing or collecting reel or spool and the mechanism which is used to drive such reel or spool at different speeds.

A concomitant object of the invention is to provide a driving connection between a reel and its spindle and to construct and assemble the drive in such a way that the reel may rotate with reference to the spindle or at the exact speed of the spindle, and that the reel may be retained on or allowed to be removed from the spindle by the same member which establishes or terminates the driving connection between the spindle and the reel.

Another object of the invention is to provide a connection of the just outlined characteristics which is constructed and assembled in such a way that, in addition to presenting a visually detectable symbol or marker, it also provides an audible or otherwise detectable signal when the driving connection is properly set for forward or reverse rotation of the reel as well as when the reel can be detached from the spindle.

An additional object of our invention is to provide a connection of the above outlined characteristics which, though readily usable in many types of intelligence reproducing apparatus, has been found to be especially suited for use in projectors for 8 mm. film.

Briefly stated, one feature of our invention resides in the provision of an apparatus for reproducing visible and/or audible intelligence which comprises a support, such as the housing of a film projector or tape recorder, a rotary spindle mounted in or carried by the support, drive means for rotating the spindle, a clutch element rotatably mounted on the spindle, brake means comprising cooperating braking members respectively provided on the clutch element and on the support and tending to hold the clutch element against rotation, an intelligence storing reel coaxially mounted on and coupled for rotation with the clutch element, and motion transmitting means mounted on the spindle for rotation therewith and movable into and out of direct motion transmitting engagement with the clutch element so that the reel may be driven at the speed of the spindle when the motion transmitting means connects the spindle with the clutch element.

The novel features which are considered as characteristic of the invention are set forth in particular in the appended claims. The improved intelligence reproducing apparatus itself, however, both as to its construction and the mode of manipulating the same, together with additional features and advantages thereof, will be best understood upon perusal of the following detailed description of a specific embodiment with reference to the accompanying drawings, in which:

Figure 1:
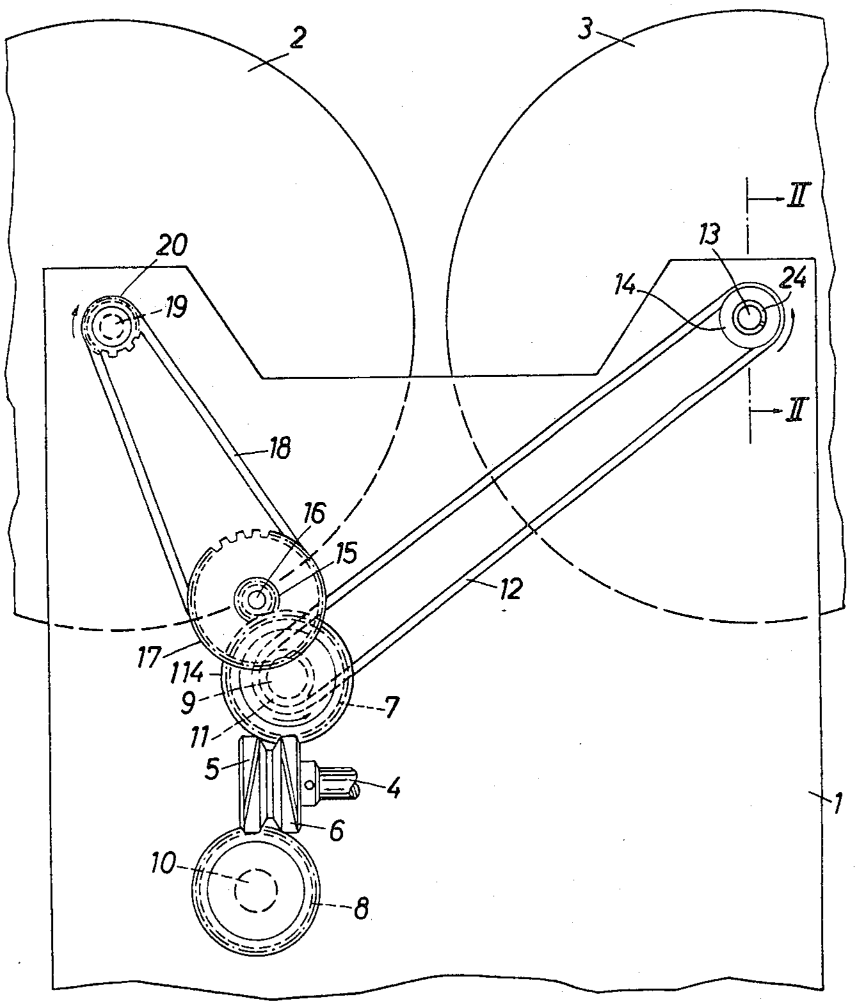
FIG. 1 is a fragmentary diagrammatic side elevational view of a film projector which embodies our invention.

Referring to FIG. 1, there is shown a portion of an intelligence reproducing apparatus, for example, a movie projector for 8 mm. film. The projector comprises a housing or support 1 for two spaced parallel shafts or spindles 13 and 19 which rotate in opposite directions. The spindle 13 supports a take-up reel or spool 3 and the spindle 19 supports a supply reel or spool 2. When the projector is set for forward operation, the reel 2 will pay out the film and the reel 3 will collect the film in a manner well known from the art of such apparatus. Inversely, when the projector is set for reverse or rewind operation, the reel 2 will be driven at a high speed to collect the film which is being paid out by the take-up reel 3.

The drive for the spindles 13 and 19 includes a main drive shaft 4 which is rotatably mounted in the housing 1 and is driven by a conventional motor, not shown. The main drive shaft 4 actuates the customary claw pull-down and the revolving shutter of the projector and it also carries two worm wheels 5 and 6 which respectively mesh with helical gears 7 and 8. The gear 8 drives a shaft 10 which carries a customary film transporting sprocket (not shown) and the gear 7 drives a shaft 9 which also carries a film transporting sprocket.

The shaft 9 further carries a pulley 11 forming part of a belt drive which also includes a pulley 14 on the spindle 13 and an elastically expansible endless flexible element 12 which is trained around the pulleys 11 and 14. A gear 114 on the shaft 9 meshes with a pinion 15 mounted on an intermediate shaft 16 which carries a relatively large sprocket 17, the latter forming part of a chain drive which further includes a relatively small sprocket 20 on the spindle 19 and an endless chain 18 which is trained around the sprockets 17, 20. When the chain 18 drives the sprocket 20 in a clockwise direction, as viewed in FIG. 1, the film is being rewound at a very high speed by being paid out from the take-up reel 3 and by being convoluted onto the core of the supply reel 2. In other words, the chain drive 17, 18, 20 constitutes a step-up transmission. The motor for the main shaft 4 need not be of the reversible type because the spindles 13, 19 can rotate in the opposite directions during forward operation and during rewinding without changing the direction of rotation.

Figure 2:
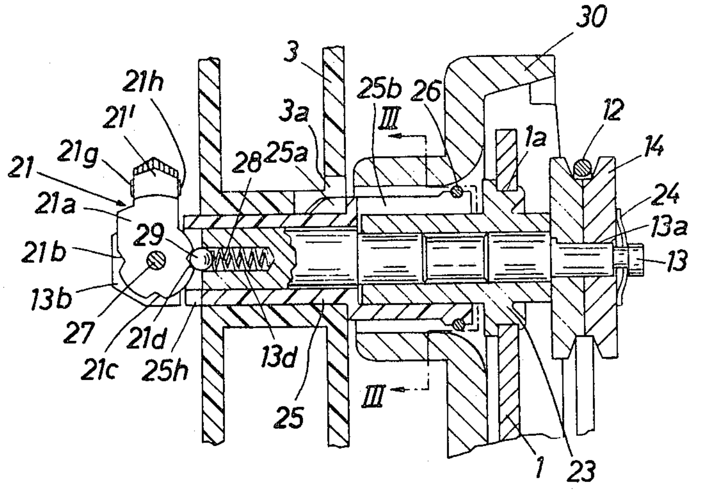
FIG. 2 is an enlarged fragmentary transverse section substantially as seen in the direction of arrows from the line II—II of FIG. 1 and illustrates the drive for the take-up reel of the projector.
Figure 3:
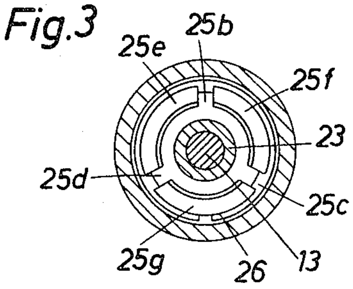
FIG. 3 is a section substantially as seen in the direction of arrows from the line III—III of FIG. 2.

Our present invention is particularly concerned with the manner of mounting, removing and/or driving the reels 2 and 3 at requisite speeds. The driving connection between the spindle 13 and take-up reel 3 is illustrated in greater detail in FIGS 2 and 3. As shown in FIG. 2, the housing or support 1 is provided with a bore 1*a* which which accommodates a bearing sleeve 23 rotatably receiving an intermediate portion of the spindle 13. The sleeve 23 is riveted or otherwise non-rotatably secured to and can be considered as constituting an integral part of the housing 1. The right-hand end portion of the spindle 13, as viewed in FIG. 2, is provided with an axially extending flat facet 13*a* and is surrounded by a complementary portion of the pulley 14 so that the latter cannot rotate with reference to the spindle 13. An elastic split ring or snap-on ring 24 is used to prevent wobbling of the pulley 14 and to allow for detachment of this pulley when necessary.

The left-hand end portion of the spindle 13 extends beyond the bearing sleeve 23 and is partially surrounded by a hollow cylindrical clutch element 25 which also surrounds a portion of the sleeve 23. The clutch element 25 consists of relatively rigid but still somewhat elastic wear-resistant synthetic plastic material, and its right-hand portion is formed with three equidistant axially extending slits 25*b*, 25*c*, 25*d* (see FIG. 3) which define between themselves three flexible tongues 25*e*, 25*f*, 25*g*. These tongues surround a cylindrical portion of the bearing sleeve 23 which latter constitutes a stationary braking member for the clutch element 25. The tongues 25*e*, 25*f*, 25*g* together constitute a movable braking member and cooperate with the sleeve 23 to normally hold the clutch element 25 against rotation with reference to the housing 1. A median portion of the clutch element 25 comprises a radially outwardly extending key 25*a* which is received in a complementary recess 3*a* here shown as flat radially extending groove provided in the right-hand flange of the reel 3. Thus, the reel 3 is coaxial with and is coupled for rotation to the clutch element 25. The key 25*a* may be integrally formed on or is rigidly secured to the clutch element 25.

The internal diameter of the annulus defined by the tongues 25*e*, 25*f*, 25*g* of the clutch element 25 is preferably somewhat smaller than the external diameter of the left-hand portion of the bearing sleeve 23 so that the latter is engaged by the tongues with at least some friction. Since the tongues 25*e*, 25*f*, 25*g* may be flexed, there is no problem in assembling the clutch element 25 with the bearing sleeve 23. In order to increase friction between these parts, the peripheral surface of the annulus formed by the tongues 25*e*, 25*f*, 25*g* is preferably provided with one or more circumferential grooves each of which may receive an elastic compressing ring 26, only one such ring being actually shown in FIG. 2. Thus, the ring 26 can be said to constitute a component part of that braking member which in turn forms part of the clutch element 25 and cooperates with the bearing sleeve 23 to normally hold the clutch element against rotation with reference to the housing or support 1. As stated hereinabove, the material of the clutch element 25 is preferably a wear-resistant plastic so that the tongues 25*e*, 25*f*, 25*g* undergo little wear even though the clutch element must rotate with reference to the bearing sleeve 23. The ring 26 may consist of spring steel or another suitable metallic material. The brake including the sleeve 23, the tongues 25*e*, 25*f*, 25*g* and the compressing member 26 is practically noiseless and occupies a minimum of space. The diameter of the axial bore in the reel 3 is preferably such that this bore receives a cylindrical median portion of the clutch element with a minimum of clearance.

The left-hand end portion of the spindle 13 is formed with a diametral slot 13*b* receiving a portion of a motion transmitting member or coupling member 21 (hereinafter called clip) which is turnable on a cross pin 27 but is compelled to share all rotary movements of the spindle. The axis of the cross pin 27 is normal to the axis of the spindle 13. In the end position as actually shown in FIG. 2, the clip 21 merely serves as a means for preventing accidental separation of the reel 3 from the clutch element 25 and allows the spindle 13 to rotate with reference to the clutch element. However, if the clip 21 is turned in a counterclockwise direction, as viewed in FIG. 2, and through an angle of substantially 180 degrees to assume a second end position, its eccentric portion or nose 21*a* will enter an open slot 25*h* in the left-hand end face of the clutch element 25 and will provide a direct driving connection between the elements 13 and 25. Thus, when the nose 21*a* extends into the slot 25*h* and the pulley 14 of the drive for the spindle 13 rotates, the reel 3 will be compelled to rotate at the exact speed of the spindle 13 because the spindle is coupled to the clutch element 25 and the latter is coupled to the reel. In the end position of FIG. 2, as well as in the other end position in which its nose 21*a* extends into the slot 25*h* of the clutch element 25, the clip 21 simultaneously prevents accidental detachment of the reel 3 from the clutch element 25 because its handgrip portion 21' (namely, that portion which is located at a maximum distance from the cross pin 27) extends radially and beyond the outline of the left-hand end of the clutch element 25 and into the path of the left-hand flange of the reel 3. However, the reel 3 can be readily withdrawn in a direction to the left, as viewed in FIG. 2, if the clip 21 is moved to an intermediate position in which the handgrip portion 21' is located directly to the left of the slot 13*b*. In such median position of the clip 21, its maximum transverse dimension (as seen in a direction at right angles to the axis of the spindle 13) is less than the diameter of the axial bore in the reel 3. In other words, the clip 21 is then located within the confines of the cylindrical surface surrounding the bore in the reel 3.

In order to insure that the clip 21 may be held in each of its three positions with a force which exceeds the force produced by friction existing between the clip and the cross pin 27, we prefer to provide the spindle 13 with with a detent which enables the user to actually hear and feel when the clip 21 reaches the desired position. This detent is accommodated in an axially extending blind bore 13*d* provided in the left-hand end face of the spindle 13 and includes a compressed helical spring 28 in the bore 13*d*, and a sphere 29 which is biased by the spring 28 and bears against the end face of the clip 21. The end face of this clip is formed with three substantially V-shaped notches 21*b*, 21*c*, 21*d* the latter of which receives a portion of the sphere 29 when the clip 21 is held in the end position of FIG. 2. When the clip 21 is to provide a direct motion transmitting connection between the spindle 13 and the clutch element 25, the sphere 29 extends into the notch 21*b*. This sphere will extend into the notch 21c when the clip 21 has been moved to its median position and allows for removal or reinsertion of the reel 3.

The numeral 30 denotes in FIG. 2 a cupped protector which surrounds the tongues 25e, 25f, 25g and the compressing ring 26 to prevent entry of dust or other foreign matter between the frictionally engaging surfaces of the braking members.

Figure 4:
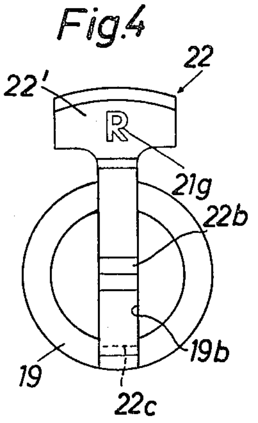
FIG. 4 is an end elevational view of a portion of the drive for the supply reel of the projector.

FIG. 4 illustrates the end face of the second spindle 19 which has a diametral slot 19b corresponding to the slot 13b and accommodating a portion of a coupling member or clip 22 which is analogous to the clip 21 and is also provided with three notches of which only the notches 22b and 22c are visible in FIG. 4.

The handgrip portion 21' of the clip 21 carries two symbols or markers 21g, 21h the former of which is visible when the clip assumes the end position of FIG. 2 and does not establish a direct motion transmitting connection between the spindle 13 and clutch element 25. The marker 21h is visible when the clip 21 is turned through 180 degrees and its projection 21a enters the slot 25h of the clutch element 25. For example, the marker 21g may consist of a letter R indicating that the reel 3 is ready to discharge the film which is to be collected by the reel 2 when the latter is driven at a high speed by the chain drive 17, 18, 20. During such rewinding or reverse operation, the spindle 13 rotates but does not drive the reel 3 which latter is rotated by the unwinding film to drive the clutch element 25. The element 25 must overcome friction between the tongues 25e, 25f, 25g and the bearing sleeve 23. Thus, the braking means is then operative and prevents excessive acceleration of the take-up spool 3 during rapid rewinding of film back onto the supply spool 2. The marker 21h may consist of a letter F which is to indicate that the projector is ready for forward operation. During such forward operation, the projection 21a of the clip 21 extends into the slot 25h and the spindle 13 is driven by the belt drive 11, 12, 14 to rotate at a relatively low speed such as is necessary for projection of pictures onto a screen. The clutch element 25 is directly coupled with the spindle 13 via clip 21 and rotates the reel 3 at the same speed so that the latter draws the film off the supply reel 2. The reel 2 is rotated by unwinding film, not by the spindle 19 even though the latter is driven by the sprocket 20. The reel 2 rotates against the resistance offered by the braking means on the spindle 19.

The position of the markers on the clip 22 for the spindle 19 is just the reverse. Thus, when the clip 21 exposes the R marker 21g because it does not provide a direct connection between the spindle 13 and clutch element 25, the clip 22 also exposes the R marker 22g even though it does provide a direct driving connection between the spindle 19 and the respective clutch element. This will be readily understood since, when the projector is set for reverse or rewind operation, the spindle 19 must be drivingly connected with the supply reel 2 to rotate the latter at a high speed determined by the chain drive 17, 18, 20. The non-illustrated second marker on the handgrip portion 22' of the clip 22 shown in FIG. 4 may consist of a letter F which is visible when the clip 22 does not provide a direct driving connection between the spindle 19 and the respective clutch element and reel 2.

As mentioned hereinbefore, the structure shown in FIGS. 1 to 4 may be utilized with equal advantage in other intelligence reproducing apparatus, particularly in tape recorders, to provide a very simple and reliable forward and reverse drive for the reels which store the tape. The reverse or rewind drive may rotate the supply reel of the tape recorder at a high speed to reduce the time needed for rewinding.

It will be seen that the driving connection between the main drive shaft 4 and the spindle 19 for the supply spool 2 is of the positive type because the chain drive 17, 18, 20 does not allow for slippage of the spindle 19. On the other hand, the drive between the main shaft 4 and the spindle 13 for the take-up reel 3 is of the non-positive or frictional type because the belt drive includes an endless flexible element 12 which is elastic and can slip with reference to the pulley 11 and/or 14. The brakes for the spindles 13 and 19 insure that the film or tape is convoluted with some tension regardless of whether such film or tape travels from the reel 2 toward the reel 3 or vice versa. The clutch elements 25 may be made of polyacetal resin or other plastic material having similar properties.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. In an intelligence reproducing apparatus, particularly in a film projector or tape recorder, a housing; a pair of spindles rotatably carried by said housing and each arranged to rotatably support a reel; a drive for rotating said spindles; and a coupling member mounted on each of said spindles for movement at the will of the operator between an uncoupling position in which it extends substantially in the longitudinal direction of the respective spindle and a coupling position in which it extends substantially transversely of the respective spindle to thereby couple the latter to the associated reel.

2. In an intelligence reproducing apparatus, particularly in a film projector or tape recorder, a housing; a pair of spindles rotatably carried by said housing; a drive for rotating said spindles; a clutch element rotatably mounted on each of said spindles; a reel mounted on and coupled for rotation with each of said clutch elements; and a coupling member mounted on each of said spindles for rotation therewith, each of said coupling members being movable with reference to the respective spindle at the will of the operator between an uncoupling position in which it extends substantially axially of the respective spindle and a coupling position in which it extends substantially transversely of the respective spindle and is in direct motion transmitting engagement with the associated clutch element.

3. In an intelligence reproducing apparatus, particularly in a film projector or tape recorder, a housing; a pair of parallel spindles rotatably carried by said housing; a drive for rotating said spindles in opposite directions; a clutch element rotatably mounted on each of said spindles, each of said spindles having a diametrally slotted end portion extending beyond the respective clutch element and each of said clutch elements having a slotted end face adjacent to the end portion of the respective spindle; a reel mounted on and coupled for rotation with each of said clutch elements, each of said reels having a flange adjacent to the end portion of the respective spindle; and a clip mounted in each of said slotted end portions for rotation with the respective spindle and also for rotation about an axis which is normal to the axis of the respective spindle, each of said clips having a handgrip portion and being movable between two end positions in each of which its handgrip portion overlies the flange of the respective reel to prevent axial displacement of the reel with reference to the respective clutch element and each of said clips further having a projection extending into the slotted end face of the respective clutch element to establish a direct driving connection between such clutch element and the respective spindle.

4. A structure as set forth in claim 3, wherein each of said reels is provided with a central bore receiving a portion of the respective clutch element and wherein each of said clips is movable to a median position in which the respective reel may be pulled off or reinserted onto the respective clutch element, the dimensions of said clips being such that they remain within the outlines of the surfaces surrounding the bores of the respective reels when moved to said median positions thereof.

5. A structure as set forth in claim 4, wherein each of said clips is provided with a pair of markers one of which is visible in the one and the other of which is visible in the other end position of the respective clip.

6. A structure as set forth in claim 4, further comprising detent means for yieldably holding said clips in each of said end positions and in said median positions thereof.

7. A structure as set forth in claim 6, wherein the end portions of said spindles are provided with axially extending bores and wherein each of said detent means comprises a resilient element provided in each of said last named bores and a sphere biased by such resilient element to bear against the respective clip, each of said clips having three spaced notches each of which receives a portion of the adjacent sphere in a different position of the respective clip.

8. In an intelligence reproducing apparatus, particularly in a film projector or tape recorder, a housing; a pair of parallel spindles rotatably carried by said housing and each arranged to rotatably support a reel; a drive for rotating said spindles in opposite directions including a main drive shaft, a positive driving connection between said main drive shaft and one of said spindles, and a frictional driving connection between said main drive shaft and the other of said spindles; and a coupling member mounted on each of said spindles and turnable with reference thereto at the will of the operator about an axis which is substantialy normal to the spindle axis between an uncoupling position in which it extends substantially in the axial direction of the respective spindle and a coupling position in which it extends transversely of the respective spindle so as to couple the latter to the associated reel.

9. A structure as set forth in claim 8, wherein one of said driving connections constitutes a step-up transmission.

10. In an intelligence reproducing apparatus, particularly in a film projector or tape recorder, a housing; a pair of spindles rotatably carried by said housing; a drive for rotating said spindles; a clutch element rotatably mounted on each of said spindles; cooperating braking members provided on said clutch elements and on said housing and tending to hold said clutch elements against rotation with reference to said housing; a reel mounted on and coupled for rotation with each of said clutch elements; and coupling member mounted on each of said spindles for rotation therewith, each of said coupling members being turnable at the will of the operator about an axis which is substantially normal to the axis of the respective spindle between an uncoupled position in which it extends substantially in the axial direction of the respective spindle and a coupling position in which it extends substantially transversely of the respective spindle and engages the associated clutch element to rotate the latter in response to rotation of the spindle.

11. A structure as set forth in claim 20, further comprising an elastically deformable metallic compressing ring surrounding each of said annuli for pressing said tongues against the respective bearing sleeves.

12. In an apparatus for reproducing intelligence, a support; a spindle rotatably carried by said support; drive means for rotating said spindle; a clutch element rotatably mounted on said spindle; a reel coaxially mounted on and coupled for rotation with said clutch element; and a coupling member mounted on said spindle for rotation therewith, said coupling member being movable with reference to said spindle at the will of the operator between an uncoupling position in which it is disengaged from said clutch element and extends substantially axially of said spindle and a coupling position in which it extends substantially transversely of said spindle and is in motion transmitting engagement with said clutch element.

13. In an apparatus for reproducing intelligence, a support; a spindle element rotatably mounted in said support; drive means for rotating said spindle element; a clutch element rotatably mounted on said spindle element; a reel coaxially mounted on and coupled for rotation with said clutch element; and a coupling member mounted on one of said elements for rotation therewith and being movable with reference to said one element at the will of the operator between an uncoupling position of disengagement with the other element and a coupling position of motion transmitting engagement with said other element so that said spindle element can drive said clutch element in the coupling position of said coupling member.

14. In an apparatus for reproducing intelligence, a support; a spindle rotatably carried by said support; drive means for rotating said spindle; a clutch element rotatably mounted on said spindle; brake means including cooperating braking members respectively provided on said clutch element and on said support and tending to hold the clutch element against rotation with reference to said support; a reel coaxially mounted on and coupled for rotation with said clutch element; and a coupling member mounted on said spindle for rotation therewith and movable with reference to said spindle at the will of the operator between an uncoupling position in which it is disengaged from said clutch element and extends substantially axially of said spindle and a coupling position in which it extends substantially transversely of said spindle and transmits torque from the spindle to said clutch element.

15. In an intelligence reproducing apparatus, a support; a spindle rotatably carried by said support; a drive for rotating said spindle in a predetermined direction; a hollow clutch element rotatably mounted on said spindle, said clutch element having an annular portion provided with a slotted end face and said spindle having a diametrally slotted end portion extending beyond said end face; a reel having an axial bore receiving said portion of the clutch element, said reel being axially movable on and being coupled for rotation with said clutch element; and a motion transmitting member having a portion extending into the slotted end portion of said spindle, said motion transmitting member being rotatable with said spindle and being also turnable with reference to the spindle about a predetermined axis which is normal to the spindle axis, said motion transmitting member being movable about said predetermined axis between two end positions and comprising a second portion extending radially beyond the outline of said clutch element in each of said end positions to prevent axial displacement of said reel, said motion transmitting member also comprising a third portion which extends into said slotted end face in one end position thereof to establish a direct driving connection between said spindle and said reel via said clutch element.

16. In an intelligence reproducing apparatus, a support; a spindle rotatably carried by said support; a drive for rotating said spindle in a predetermined direction; a hollow clutch element rotatably mounted on said spindle, said clutch element having an annular portion provided with a slotted end face and said spindle having a diametrally slotted end portion extending beyond said end face; a reel having an axial bore receiving said portion of the clutch element, said reel being axially movable on and being coupled for rotation with said clutch element; a motion transmitting member having a portion extending into the slotted end portion of said spindle, said motion transmitting member being rotatable with said spindle and being also turnable with reference to the spindle about a predetermined axis which is normal to the spindle axis, said motion transmitting member being movable about said predetermined axis between two end positions and comprising a second portion extending radially beyond the outline of said clutch element in each of said end positions to prevent axial displacement of said reel, said motion transmitting member also comprising a third portion which extends into said slotted end face in one end position thereof to establish a direct driving connection between said spindle and said reel via said clutch element; and a pair of markers provided on said motion transmitting member, one of said markers being concealed in one end position and the other marker being concealed in the other end position of said motion transmitting member.

17. In an intelligence reproducing apparatus, a support; a spindle rotatably carried by said support; a drive for rotating said spindle in a predetermined direction; a hollow clutch element rotatably mounted on said spindle, said clutch element having an annular portion provided with a slotted end face and said spindle having a diametrally slotted end portion extending beyond said end face; a reel having an axial bore receiving said portion of the clutch element, said reel being axially movable on and being coupled for rotation with said clutch element; a motion transmitting member having a portion extending into the slotted end portion of said spindle, said motion transmitting member being rotatable with said spindle and being also turnable with reference to the spindle about a predetermined axis which is normal to the spindle axis, said motion transmitting member being movable about said predetermined axis between two end positions and comprising a second portion extending radially beyond the outline of said clutch element in each of said end positions to prevent axial displacement of said reel, said motion transmitting member also comprising a third portion which extends into said slotted end face in one end position thereof to establish a direct driving connection between said spindle and said reel via said clutch element and said motion transmitting member being also movable to a median position in which it is located within the outlines of said annular portion and permits axial movement of said reel onto and off said clutch element; and detent means for yieldably holding said motion transmitting member in each of said three positions thereof.

18. In an intelligence reproducing apparatus, particularly in a film projector or tape recorder, a housing; a pair of spindles rotatably carried by said housing and each thereof having an end portion provided with a diametral slot; a drive for rotating said spindles; a clutch element rotatably mounted on each of said spindles, each of said clutch elements having a slot; a reel mounted on and coupled for rotation with each of said clutch elements; and motion transmitting means mounted on each of said spindles for rotation therewith, each of said motion transmitting means comprising a clip having a first portion extending into the corresponding diametral slot and rotatable about an axis which is normal to the axis of the respective spindle and a second portion movable into or out of the slot in the respective clutch element to thereby establish or terminate a direct motion transmitting connection between the corresponding spindle and the clutch element thereon so that said reels are compelled to rotate at the speed of their spindles when the second portions of said clips extend into the slots of the associated clutch elements.

19. In an intelligence reproducing apparatus, particularly in a film projector or tape recorder, a housing; a pair of spindles rotatably carried by said housing; a drive for rotating said spindle; a clutch element rotatably mounted on each of said spindles; a reel mounted on and coupled for rotation with each of said clutch elements, each of said clutch elements consisting of wear-resistant synthetic plastic material and comprising a key extending into a complementary recess provided in the respective reel so that such reels are compelled to rotate with the corresponding clutch elements, or vice versa; cooperating braking members provided on said clutch elements and on said housing and tending to hold said clutch elements against rotation with reference to said housing; and motion transmitting means mounted on each of said spindles for rotation therewith, each of said motion transmitting means being movable into and from direct motion transmitting engagement with the respective clutch element so that the corresponding reels are compelled to rotate at the speed of their spindles when said motion transmitting means engage the respective clutch elements.

20. In an reproducing apparatus, particularly in a film projector or tape recorder, a housing; a pair of spindles rotatably carried by said housing; a drive for rotating said spindles; a clutch element rotatably mounted on each of said spindles; cooperating braking members provided on said clutch elements and on said housing and tending to hold said clutch elements against rotation with reference to said housing, the braking members on said housing comprising cylindrical bearing sleeves for said spindles and the braking members on said clutch elements comprising annuli of axially extending tongues surrounding and frictionally engaging with the respective bearing sleeves; a reel mounted on and coupled for rotation with each of said clutch elements; and motion transmitting means mounted on each of said spindles for rotation therewith, each of said motion transmitting means being movable into and from direct motion transmitting engagement with the respective clutch element so that the corresponding reels are compelled to rotate at the speed of their spindles when said motion transmitting means engage the respective clutch elements.

References Cited

UNITED STATES PATENTS 2,746,690 5/1956 Ropke -------------- 242—54
3,130,935 4/1964 Aldridge ---------- 242—53.12
3,310,638 3/1967 Burton et al. ------ 242—55.12

LEONARD D. CHRISTIAN, *Primary Examiner.*